(12) United States Patent
Safai et al.

(10) Patent No.: US 11,386,545 B2
(45) Date of Patent: Jul. 12, 2022

(54) SURFACE CRACK DETECTION

(71) Applicant: The Boeing Company, Chicago, IL (US)

(72) Inventors: Morteza Safai, Newcastle, WA (US); Gary Ernest Georgeson, Tacoma, WA (US)

(73) Assignee: The Boeing Company, Chicago, IL (US)

(*) Notice: Subject to any disclaimer, the term of this patent is extended or adjusted under 35 U.S.C. 154(b) by 40 days.

(21) Appl. No.: 16/836,596

(22) Filed: Mar. 31, 2020

(65) Prior Publication Data

US 2021/0304398 A1 Sep. 30, 2021

(51) Int. Cl.
*G06T 7/00* (2017.01)
*G01N 25/72* (2006.01)
*G01J 5/59* (2022.01)
*G06V 10/60* (2022.01)
*G06V 10/145* (2022.01)
*G01J 5/00* (2022.01)
*G02B 5/30* (2006.01)
*G06V 10/147* (2022.01)

(52) U.S. Cl.
CPC .............. *G06T 7/0008* (2013.01); *G01J 5/59* (2022.01); *G01N 25/72* (2013.01); *G02B 5/3058* (2013.01); *G06V 10/145* (2022.01); *G06V 10/147* (2022.01); *G06V 10/60* (2022.01); *G01J 2005/0077* (2013.01); *G06T 2207/10048* (2013.01); *G06T 2207/30108* (2013.01)

(58) Field of Classification Search
CPC ......... G06T 7/0008; G06T 2207/10048; G06T 2207/30108; G02B 5/3058; G06K 9/2036; G06K 9/209; G06K 9/4661; G01N 25/72; G01J 5/0825; G01J 2005/0077
See application file for complete search history.

(56) References Cited

U.S. PATENT DOCUMENTS

| 6,605,807 | B2 | 8/2003 | Safai |
| 9,234,740 | B1 | 1/2016 | Safai et al. |
| 9,752,993 | B1 | 9/2017 | Thompson et al. |
| 10,078,049 | B2 | 9/2018 | Safai et al. |
| 2004/0119018 | A1* | 6/2004 | Alfano ............... G01N 21/8422 250/341.1 |

(Continued)

FOREIGN PATENT DOCUMENTS

JP 2008020231 A * 1/2008

OTHER PUBLICATIONS

Multi-Wave and Hybrid Imaging Techniques: A New Direction for Nondestructive Testing and Structural Health Monitoring (pp. 2-4) (Year: 2017).*

(Continued)

*Primary Examiner* — Edward F Urban
*Assistant Examiner* — Wassim Mahrouka
(74) *Attorney, Agent, or Firm* — Kolisch Hartwell, P.C.

(57) ABSTRACT

A method of thermographic inspection is disclosed, including applying a thermal pulse to a surface and capturing an image of a thermal response of the surface. The image is captured with an infrared camera through a polarizer having a first orientation. The method further includes determining, by analysis of the image, whether the thermal response is indicative of a crack on the surface.

20 Claims, 5 Drawing Sheets

(56) References Cited

U.S. PATENT DOCUMENTS

| | | | |
|---|---|---|---|
| 2006/0139655 A1* | 6/2006 | Tixier | G01B 11/0641 |
| | | | 356/504 |
| 2006/0289766 A1* | 12/2006 | DiMarzio | G01N 25/72 |
| | | | 250/341.8 |
| 2007/0056940 A1* | 3/2007 | Salem | G01J 5/0003 |
| | | | 219/121.83 |
| 2007/0115463 A1* | 5/2007 | Dureiko | G01B 11/0608 |
| | | | 356/239.1 |
| 2016/0063350 A1* | 3/2016 | Newman | G06K 9/4661 |
| | | | 348/125 |
| 2018/0299392 A1* | 10/2018 | Villette | H04N 5/33 |
| 2019/0367057 A1 | 12/2019 | Georgeson et al. | |

OTHER PUBLICATIONS

Infrared Thermal Imaging, Second Edition. M. Vollmer and K.-P. Möllmann ISBN: 978-3-527-40717-0 (Year: 2010).*

Lawrence B. Wolff, Andrew Lundberg, and Renjie Tang "Thermal emission polarization", Proc. SPIE 3754, Polarization: Measurement, Analysis, and Remote Sensing II, (Oct. 25, 1999) (Year: 1999).*

* cited by examiner

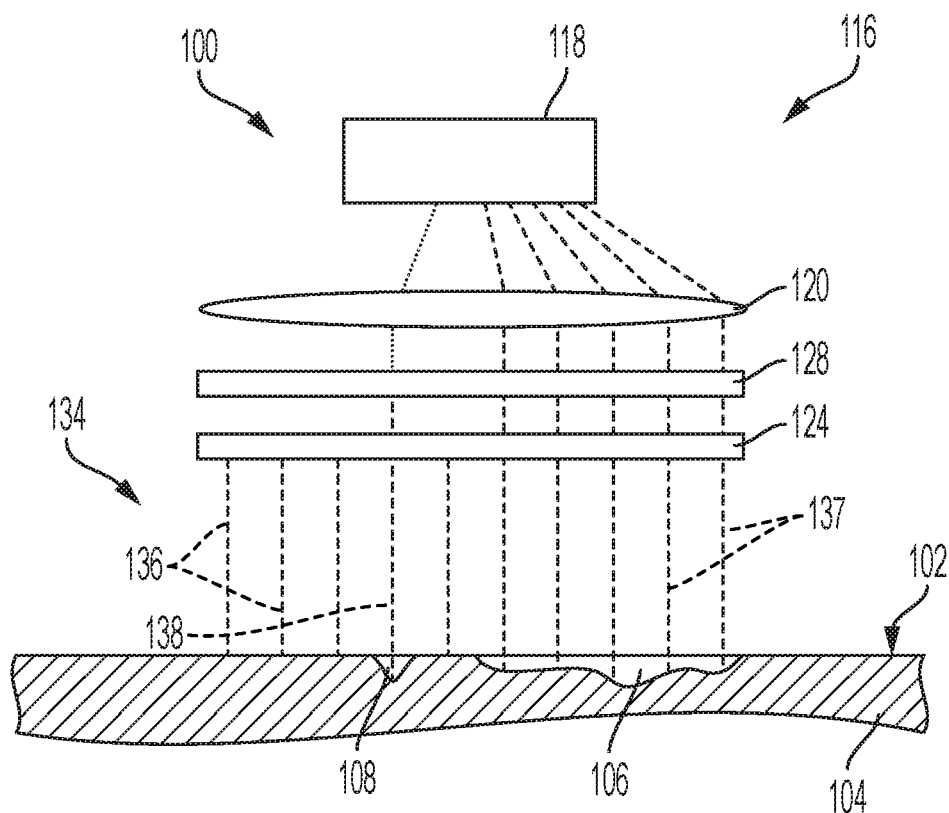
FIG. 3
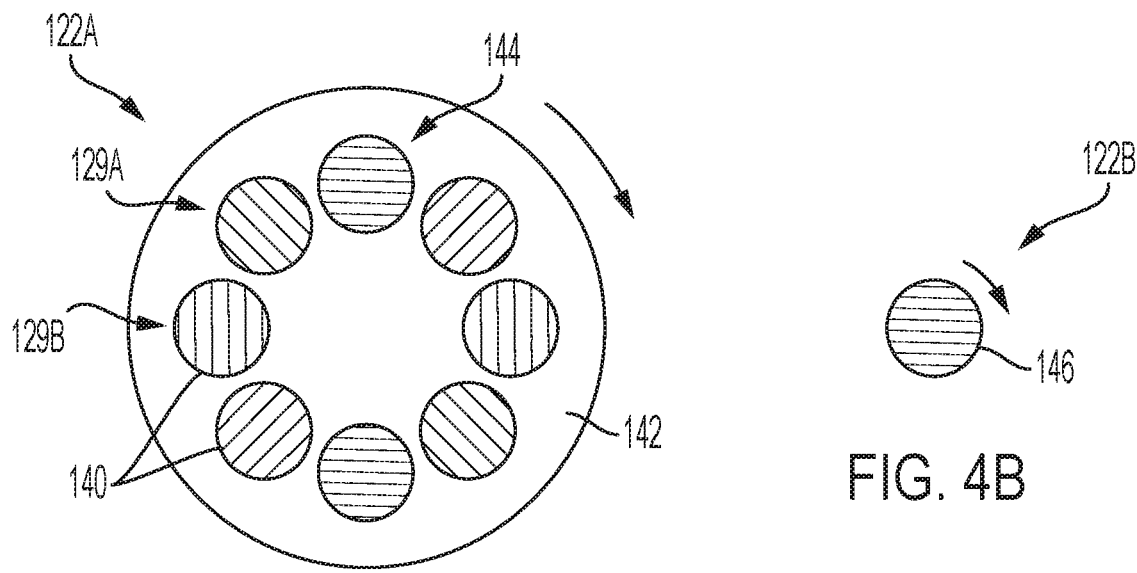
FIG. 4A
FIG. 4B

SURFACE CRACK DETECTION

BACKGROUND

Flash infrared thermography (IRT) is a thermal transient technique that uses a flash source, an infrared camera, and an image processor to analyze a structure. In one approach, one or more short pulses of high thermal energy are applied to a thermally conductive surface of a structure using a flash source. An infrared camera is then used to monitor and record thermal transients of the surface as heat disperses into the structure and the surface returns to its normal temperature. For instance, an infrared camera can be used to capture images of the surface before and after the pulses are applied.

Further, the images can then be analyzed using various image processing techniques in order to discriminate between different features and materials. In practice, material imperfections, such as voids, delamination, or cracks, can affect the cooling of the surface by causing an area of the surface to cool down faster or slower relative to other areas of the surface. Image processing algorithms can analyze a sequence of images and enhance the contrast of relatively warm or cold spots on the surface, which may be indicative of material imperfections. Further, image processing algorithms can also be used to assist in the evaluation and/or characterization of any anomalous cooling behavior.

Various approaches to detecting surface cracks exist. For example, ultrasonic inspection can be used to inspect a surface of a railcar axle, or an inspector can apply a liquid dye to a surface and observe the penetration of the liquid dye into the surface. However, these techniques can be slow and labor intensive. A rapid, large area, non-contact method with good sensitivity is desirable.

SUMMARY

The present disclosure provides systems, apparatuses, and methods relating to detection of surface cracks. In some examples, a method of thermographic inspection may include applying a thermal pulse to a surface and capturing an image of a thermal response of the surface. The image may be captured with an infrared camera through a polarizer having a first orientation. The method may further include determining, by analysis of the image, whether the thermal response is indicative of a crack on the surface.

In some examples, a method of detecting cracks in a surface may include heating the surface and capturing a first image of thermal emissions from the surface through a wire grid polarizer in a first orientation. The method may further include capturing a second image of thermal emissions from the surface through a wire grid polarizer in a second orientation, and comparing the first and second images. The method may further include identifying regions of the surface with thermal emissions corresponding to a cooler temperature, wherein the thermal emissions corresponding to a cooler temperature have a relatively greater intensity in the first image or the second image.

In some examples, a system for detecting cracks in a surface may include a light source configured to generate a thermal pulse incident on the surface and an infrared camera configured to capture an image of a response of the surface to the thermal pulse. The system may further include a wire grid polarizer interposed between the surface and the infrared camera, having a first orientation, and a data processing system in communication with the infrared camera and configured to analyze the captured image.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 3 is a schematic diagram of image capture by the thermographic crack inspection system of FIG. 1, of a thermal response of the surface of FIG. 2.

FIG. 4A is a schematic diagram of an illustrative polarization apparatus.

FIG. 4B is a schematic diagram of another illustrative polarization apparatus.

DETAILED DESCRIPTION

Figure 1:
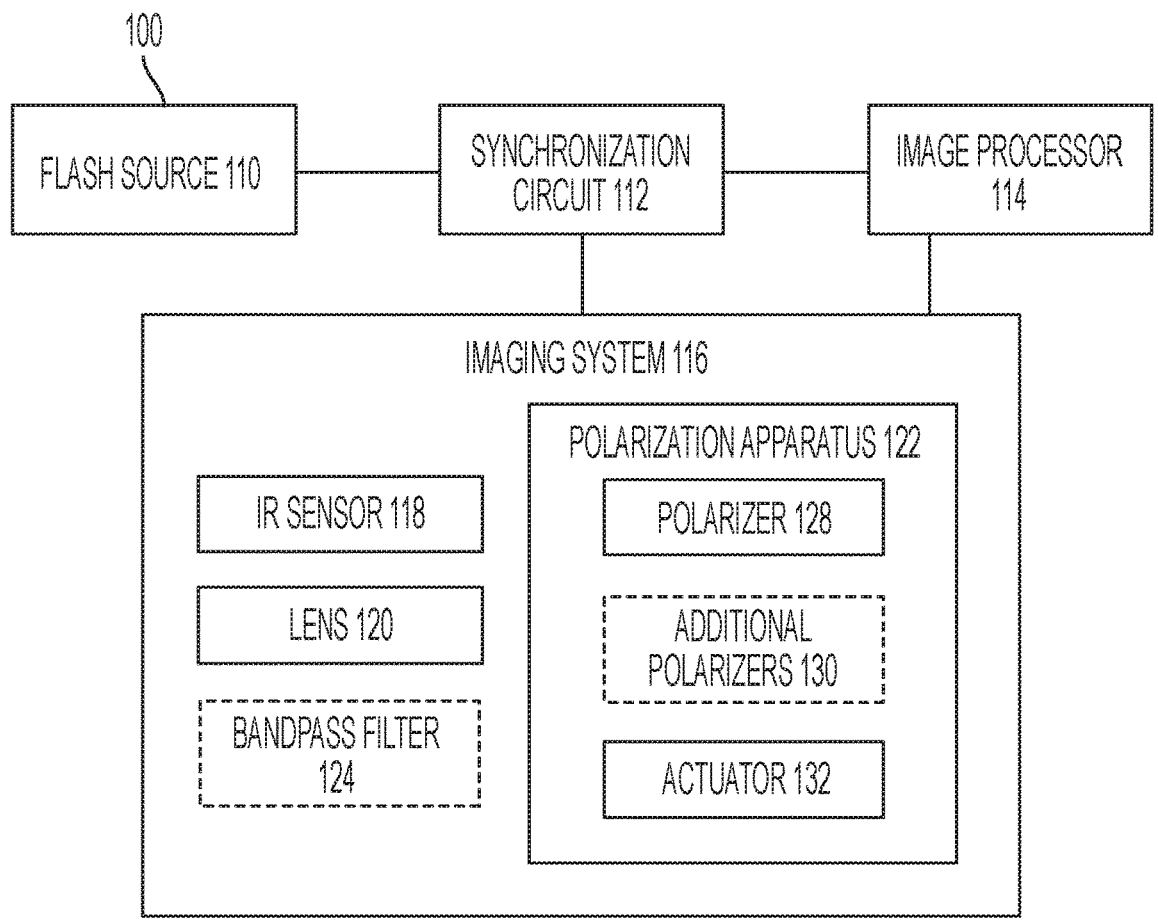
FIG. 1 is a schematic diagram of an illustrative thermographic crack inspection system in accordance with aspects of the present disclosure.

Various aspects and examples of a method of detecting surface cracks, as well as related systems, are described below and illustrated in the associated drawings. Unless otherwise specified, a method or system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a high-sensitivity system for detecting surface cracks in accordance with the present teachings includes an infrared thermography apparatus and one or more polarizers. The infrared thermography apparatus may include a thermal pulse generator such as a flash lamp and a thermal image capture apparatus such as a camera with a lens and an infrared (IR) sensitive light sensor. The thermography apparatus may be connected to an image processing system. For example, the camera may be in electronic communication with a data processing system having comparative thermographic analysis software or other image processing software.

The one or more polarizers may be mounted in a mechanical system configured to interpose polarizers of different orientations between the camera and an inspected surface. That is, the one or more polarizers may be mounted such that any light captured by the light sensor of the camera has been filtered through at least one polarizer. The polarizers may be movable such that for each image a polarizer orientation may be selected. For example, one polarizer may be rotatably mounted to the camera. For another example, two polarizers may be mounted to a rotatable structure such that rotation of the structure selects between a first one of the polarizers in a first orientation and a second one of the polarizers in a second, orthogonal orientation.

A method of detecting surface cracks may include heating a surface with a thermal pulse and capturing an image of the thermal response of the surface through a polarizer in a first orientation. The method may further include capturing another image of the thermal response through a polarizer in a second orientation. In some examples, the two images may be captured in quick succession and in some examples the surface may be heated again with another thermal pulse between image captures.

The method may include analysis of the first and second images, to identify irregularities in the thermal response of the surface. Intensity and wavelength or frequency of thermal radiation may be analyzed in each image. For example, regions with thermal emissions having a longer wavelength than those of surrounding areas may indicate faster cooling.

The method may further include comparison of the identified irregularities or regions between the first and second images. For linear irregularities such as surface cracks, the intensity of thermal emission captured may differ between the two images as a result of alignment and dis-alignment of the linear irregularity with the orientation of the polarizers. Cracks may be distinguished from other irregularities such as material impurities or surface contaminants as having such a differing intensity between the two images.

Aspects of the disclosed method of detecting surface cracks may be embodied as a computer method, computer system, or computer program product. Accordingly, aspects of the method and/or system may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the method and/or system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these.

Program code embodied on a computer-readable medium may be transmitted using any appropriate medium, including but not limited to wireless, wireline, optical fiber cable, RF, and/or the like, and/or any suitable combination of these. Computer program code for carrying out operations for aspects of the method of detecting surface and near-surface porosity may be written in one or any combination of programming languages.

Aspects of methods and systems for detecting surface cracks are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

Examples, Components, and Alternatives

The following sections describe selected aspects of exemplary methods of detecting surface cracks as well as related systems and/or apparatus. The examples in these sections are intended for illustration and should not be interpreted as limiting the entire scope of the present disclosure. Each section may include one or more distinct examples, and/or contextual or related information, function, and/or structure.

A. Illustrative Thermographic Inspection System

As shown in FIGS. 1-5, this section describes an illustrative thermographic inspection system 100. System 100 is an example of a high-sensitivity system for detecting surface cracks, as described above. FIG. 1 is a block diagram of the system, which includes a flash source 110, a synchronization circuit 112, an image processor 114, and an imaging system 116.

Figure 2:
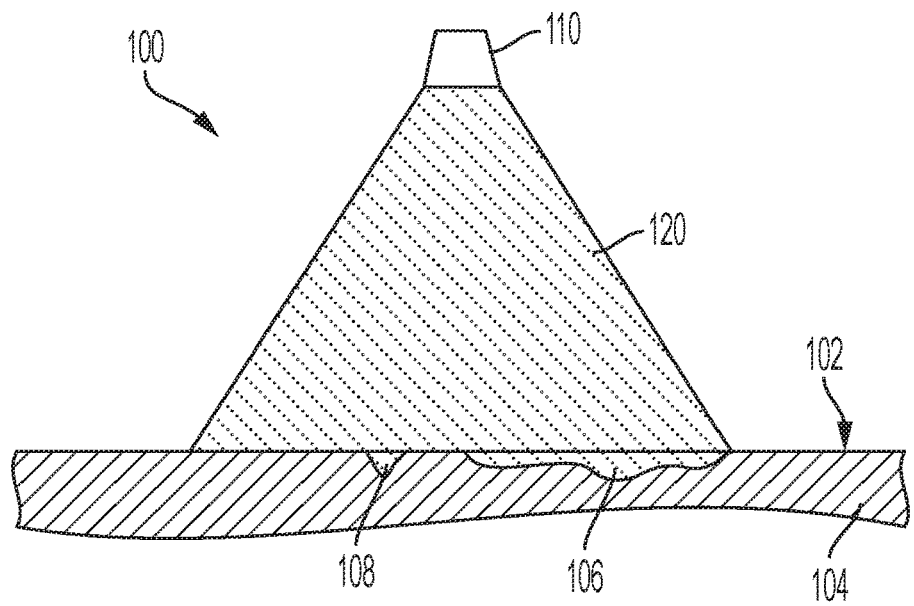
FIG. 2 is a schematic diagram of a thermal pulse applied by the thermographic crack inspection system of FIG. 1 to a surface.

Flash source 110 may include any system effective for application of a thermal pulse to a surface. The thermal pulse may comprise a short duration burst of radiation of sufficient energy to raise the temperature of the surface by a selected number of degrees. In the present example, as schematically depicted in FIG. 2, flash source 110 is a flash lamp which emits a pulse 121 of visible and/or near-infrared light. That is, the flash source produces radiation between approximately 0.2 and 1 micrometers (μm) in wavelength, in bursts of approximately 5 milliseconds (ms) or less.

In FIG. 2, flash source 110 is directed toward a surface 102 of a part 104. As described further with reference to FIG. 5 below, in the present example part 104 is an aircraft fuselage and surface 102 is comprised of an aluminum alloy. Wavelength and duration of thermal pulse 121 may be selected to produce a desired temperature increase in surface 102, depending on factors such as the material and reflectivity of the surface.

Surface 102 is depicted with an illustrative lateral crack 106 and longitudinal crack 108. As shown in FIG. 2, lateral crack 106 extends along surface 102 in a direction parallel to the page and longitudinal crack 108 extends along the surface in a direction perpendicular to the page. Thermal pulse 121 is incident on surface 102, including cracks 106, 108, and raises the temperature of the surface by a few degrees. Once the thermal pulse has ended, surface 102 may dissipate the thermal energy by radiating until the surface has returned to thermal equilibrium with the ambient atmosphere. This radiation of thermal energy may be referred to as a thermal response of the surface and/or thermal emissions of the surface.

In general, the thermal emissions of interest may have any wavelength or wavelength range longer than the wavelength or wavelength range of the thermal pulse. Suitable thermal emission wavelengths may include any or all of the infrared, namely, a range from 0.7 to 1000 µm. More specifically, the thermal emissions may have wavelengths representative of, and matched to, an initial temperature of the object being assayed and/or of a transient temperature increase of the object brought about by the thermal pulse. Shorter infrared wavelengths correspond to higher energies, higher temperatures, and larger thermal responses; longer infrared wavelengths correspond to lower energies, lower temperatures, and smaller thermal responses.

In the present example of an aluminum aircraft fuselage, the middle and/or far infrared may be of particular utility. The middle infrared, as used herein, may include wavelengths from 3 µm to 50 µm. The far infrared, as used herein, may include wavelengths from 50 µm to 1000 µm. The detected thermal emissions may include ranges within one or both of the middle infrared and far infrared, among others. For example, at least some of the thermal emissions of the surface may be between 3 and 50 µm, 5 and 30 µm, 3 and 8 µm, 3 and 5 µm, 5 and 6 µm, and 8 and 15 µm, among others.

Referring again to FIG. 1, at least a portion of the thermal response of the surface is captured by imaging system 116. The imaging system includes an IR sensor 118, a lens 120, and a polarization apparatus 122. IR sensor 118 and lens 120 may comprise part of an IR camera such as a commercially available thermal camera and/or may be separately manufactured parts combined in imaging system 116. The imaging system may be configured for high-speed image capture. For example, the system may capture images with an exposure of 1 ms or less, or record video with at least 1,000 frames per second.

In general, imaging system 116 may include any effective light sensor and objective optical element. For example, the device may include a charge coupled device (CCD) sensor, a complementary metal-oxide semiconductor (CMOS) sensor, or an infrared image sensor. The light sensor may be configured to receive wavelengths of an expected thermal response of the surface. Commonly available silicon based sensors may be appropriate for wavelengths up to approximately 1.7 micrometers (µm), but for higher wavelengths an IR specific sensor may be needed. The objective optical element may include one or more lenses and/or mirrors configured to focus light emitted by the surface onto the light sensor.

In some examples, imaging system 116 may further include a bandpass filter 124. As described further with reference to FIG. 3 below, bandpass filter 124 may be configured to pass thermal emissions associated with cracks in the surface and to filter out thermal emissions from surrounding regions of the surface. In the present example, filter 124 has a passband between approximately 5 and 6 µm.

Polarization apparatus 122 is configured to increase a relative captured intensity of thermal emissions associated with cracks as compared to thermal emissions associated with surrounding regions of the surface and other non-linear irregularities of the surface. The apparatus includes a polarizer 128 and may include one or more additional polarizers 130. As described further with reference to FIGS. 4A and 4B below, polarizer apparatus 122 further includes an actuator 132 which is configured to transition the polarizer apparatus between polarization orientations.

IR sensor 118, lens 120, bandpass filter 124, and polarization apparatus 122 may be arranged in any optically effective order and/or configuration to form imaging system 116. For example, the bandpass filter and polarization apparatus may be disposed between the lens and the sensor or may be disposed between the lens and the surface. Imaging system 116 may further include any appropriate optical, electrical, and/or mechanical components.

FIG. 3 is a schematic diagram of imaging system 116 capturing an image of a thermal response 134 of surface 102. The thermal response includes emissions 136 from smooth regions of surface 102 having a first spectral signature associated with a first temperature, emissions 137 from lateral crack 106 having a second spectral signature associated with a second temperature, and emissions 138 from longitudinal crack 108 having a third spectral signature associated with a third temperature. The second and third temperatures may be cooler than the first temperature. For example, the second and third temperatures may be between approximately one tenth of one degree and one degree cooler than the first temperature.

In the depicted configuration of imaging system 116, bandpass filter 124 is closest to surface 102, followed by polarizer 128, lens 120, and IR sensor 118. Emissions 136, 137, and 138 from surface 102 are all incident on bandpass filter 124, but only the emissions having a spectral signature associated with a cooler temperature are passed by the filter. In other words, the passband of filter 124 is selected such that the majority of wavelengths in emissions 136 from smooth regions of surface 102 and blocked, but the majority of wavelengths of emissions 137, 138 from the cracks are transmitted by the filter. The cooler temperatures of cracks 106, 108 resulting from accelerated cooling relative to the rest of surface 102 may be associated with longer wavelengths.

Filtering thermal response 134 with bandpass filter 124 may increase the relative intensity of emissions captured from areas of interest on surface 102. In some examples, imaging system 116 may not include a filter, and all emissions 136, 137, 138 may be incident on polarizer 128. In such examples, image processing may achieve similar filtering after image capture.

Polarizer 128 is a wire grid polarizer (WGP). That is, polarizer 128 is a linear polarizer including a plurality of parallel fine metal wires arranged in a plane. Imaging system 116 may be positioned, and/or the polarization apparatus configured as described below, such that the plane of polarizer 128 is approximately parallel to and/or tangent to surface 102. A WGP may be particularly suited for the present application, as such polarizers efficiently pass far-infrared and mid-infrared radiation while other polarizer types such as dielectric polarizers may have primarily optional transmission windows and/or may be prone to reflection in the IR range.

Limiting reflections captured by imaging system 116 may be beneficial to the sensitivity of the thermography inspection system. More specifically, reducing reflections captured by IR sensor 118 may allow additional relevant radiation to be captured, and increase the signal-to-noise ratio of the captured images.

In FIG. 3, polarizer 128 is laterally aligned. That is, the plurality of wires of polarizer 128 are approximately perpendicular to the linear extent of lateral crack 106. The polarizer is out of alignment with longitudinal crack 108, with the plurality of wires approximately parallel to the extent of the longitudinal crack. The intensity of radiation from a crack that are transmitted by polarizer 128 may depend on the relative orientation of the polarizer and the linear extent of the crack. As shown in FIG. 3, emissions 137 from lateral crack 106 are fully transmitted by polarizer 128 while emissions 138 from longitudinal crack 108 are attenuated or reduced in intensity.

This effect of the orientation of polarizer 128 on captured intensity may apply to linear features of surface 102 and not to round features, and to a lesser extent from other shapes. As described with reference to FIGS. 4A and 4B below, imaging system 116 may capture at least one image with polarizer 128 in each of two orientations. The captured images may then be compared to distinguish cracks 106, 108 or other linear irregularities from generally rounded irregularities such as inclusions or surface contaminants.

Referring again to FIG. 1, imaging system 116 and flash source 110 are operatively connected to synchronization circuit 112. The synchronization circuit and imaging system are also connected to image processor 114. In some examples, synchronization circuit 112 and image processor 114 may be part of a single data processing system. In some examples, the synchronization circuit may comprise separate software and/or hardware from the image processor.

Synchronization circuit 112 may control timing of the thermal pulse generated by flash source 110, and image capture by imaging system 116. Precise timing may be important to system 100, as radiation of the thermal pulse reflected from the surface may overwhelm any image captured before the completion of the pulse, but after the pulse the surface may return to thermal equilibrium within as little as 30 ms or less. For example, synchronization circuit 112 may trigger image capture within 5 ms or within 1 ms from when the thermal pulse ends.

Image processor 114 may include software and/or hardware configured to process, analyze and communicate data received from imaging system 116 to a user of thermographic inspection system 100. For example, the image processor may include and/or may run on a data processing system as described in Example C, below. The image processor may be configured to determine, by analysis of the received data, whether the thermal response of the surface is indicative of one or more cracks.

For example, image processor 114 may evaluate wavelengths of captured thermal emissions to identify irregularities and/or inhomogeneities in the surface. To make this identification, image processor 114 may receive one or more images from imaging system 116, and analyze the images to look for areas on the surface that are cooler relative to surrounding areas of the surface. For instance, the image processor may be configured to look for areas that are, for example, a tenth of a degree cooler, one-half of a degree cooler, or one degree cooler than surrounding areas on the surface. Another technique for identifying colder areas may include calculating thermal gradients and searching for areas having non-zero thermal gradients. In some examples, identifying colder areas may involve pre-processing the images to enhance the contrast of temperature differentials on the surface.

Image processor 114 may further evaluate the received data by comparing identified irregularities in images from imaging system 116 captured through a first polarizer orientation to images captured through a second polarizer orientation, as described above. Greater intensity of emissions may be captured from linear irregularities such as cracks when the extent of the linear irregularity is aligned with the polarizer, while non-linear irregularities may exhibit no difference in intensity based on polarizer orientation.

In some examples, image processor 114 may use machine learning techniques to determine whether the captured thermal response data is indicative of a crack on the inspected surface. For instance, a machine learning model could be developed using a training set that includes images of thermal responses of surfaces that include cracks. Image processor 114 could use the machine learning model to analyze captured mages and assess whether or not the images are indicative of a crack on the surface.

The data analysis received by the user of thermographic inspection system 100 may be used for a variety of purposes. For example, the analysis may be used to pass or fail a quality control inspection of a manufactured part. For another example, detection of cracks may be used to identify vehicle components in need of repair or replacement.

FIGS. 4A and 4B are schematic diagrams of two illustrative examples of polarization apparatus 122. In FIG. 4A, polarization apparatus 122A includes a plurality of wire grid polarizers (WGP) 140 mounted on a wheel structure 142. Apparatus 122A has an operative position 144, and wheel structure 142 is configured to rotate each polarizer of plurality of WGP 140 through the operative position successively. Rotation of wheel structure 142 may also move a selected one polarizer of plurality of WGP 140 into operative position 144.

Operative position 144 may comprise a position in alignment with the optical elements of imaging system 116, as shown in FIG. 3. In other words, a polarizer in the operative position may be aligned with the lens and any filters of the imaging system such that all radiation captured by the imaging system passes through the polarizer. Polarizer 128 for instance, as schematically depicted in the example of FIG. 3, may be in the operative position of the polarization apparatus.

Referring again to FIG. 4A, plurality of WGP 140 are arranged in alternating orientations relative to a radial direction of wheel structure 142. That is, for any two adjacent polarizers of plurality of WGP 140, the wires of one of the two polarizers are generally parallel to a radial direction of wheel structure 142 and the wires of the other of the two polarizers are generally perpendicular to the radial direction. As a result, when plurality of WGP 140 move through operative position 144 as wheel structure 142 is rotated, the polarizer in the operative position will alternate between two orthogonal orientations.

In the depicted example, plurality of WGP 140 includes only two polarizer orientations, a first orientation 129a and a second orientation 129b. In some examples, the plurality of WGP may be arranged to alternate between three, four, or more different orientations as the polarizers move through operative position 144.

Wheel structure 142 may be configured to provide rapid transition between the polarizers of plurality of WGP 140. For example, the wheel structure may have a rotational velocity and radius such that the polarizer in operative position 144 changes in approximately 1 ms or less. In some examples, polarization apparatus 122A may be configured such that wheel structure 142 spins continuously throughout operation of the thermographic inspection system, to avoid spin-up time delays. In some examples, rotation of wheel structure 142 may be coordinated and/or controlled by synchronization circuit 112 (see FIG. 1).

In FIG. 4B, polarization apparatus 122B includes one polarizer 146. Polarizer 146 is configured to rotate about a central axis, such that the orientation of the polarizer changes without altering the location of the polarizer. Polarizer 146 may remain in an operative position within imaging system 116, such as is depicted in FIG. 3. Rotation of polarizer 146 may be coordinated and/or controlled by synchronization circuit 112 (See FIG. 1), such that images are captured when the polarizer is in a desired and/or selected orientation. Polarizer 146 may be configured to rotate continuously and/or to rotate on demand between selected orientations.

Figure 5:
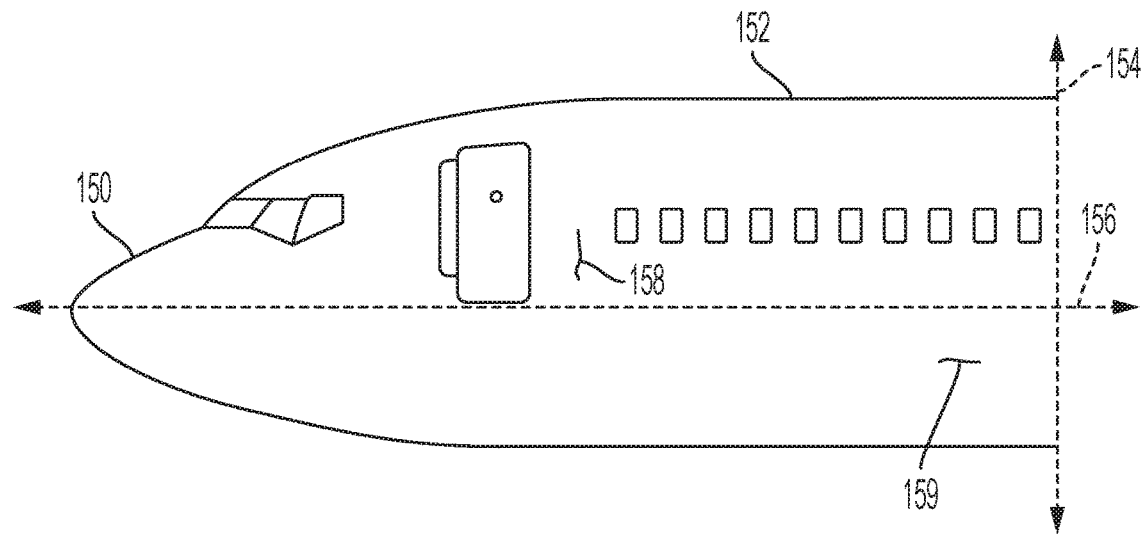
FIG. 5 is a schematic diagram of an illustrative aircraft.

FIG. 5 is a schematic diagram of an aircraft 150 having a fuselage 152. In the present example, the thermographic inspection system is configured to scan fuselage 152 for cracks. The fuselage may be described as having a vertical axis 154 and a central axis 156. The inspection system may be used to scan for cracks parallel to vertical axis 154 such as vertical crack 158 and cracks parallel to central axis 156 such as horizontal crack 159. Accordingly, the inspection system may be configured to image through polarizers oriented parallel to each of the axes 154, 156.

In some examples, fuselage 152 may have a predominant and/or expected crack direction. For instance, fastener installation in the fuselage may typically result in cracking parallel to central axis 156. In such examples, the thermographic inspection system may be configured to image through only one polarizer orientation. More specifically, referring again to FIG. 1, polarization apparatus 122 of thermographic inspection system 100 may include only polarizer 128. Polarizer 128 may be fixedly mounted in imaging system 116, in an orientation aligned with the expected crack direction.

Thermographic inspection system 100 may also be configured for other applications. For example, a lower cost example of the system designed to operate at lower speeds and capture a single image after each thermal pulse may be appropriate to small-scale or slow-speed applications such as research and development. For another example, the inspection system may be integrated into a manufacturing system such as an aircraft stringer production line for manufacturing quality control.

B. Illustrative High-Speed Railcar Axle Inspection System

Figure 6:
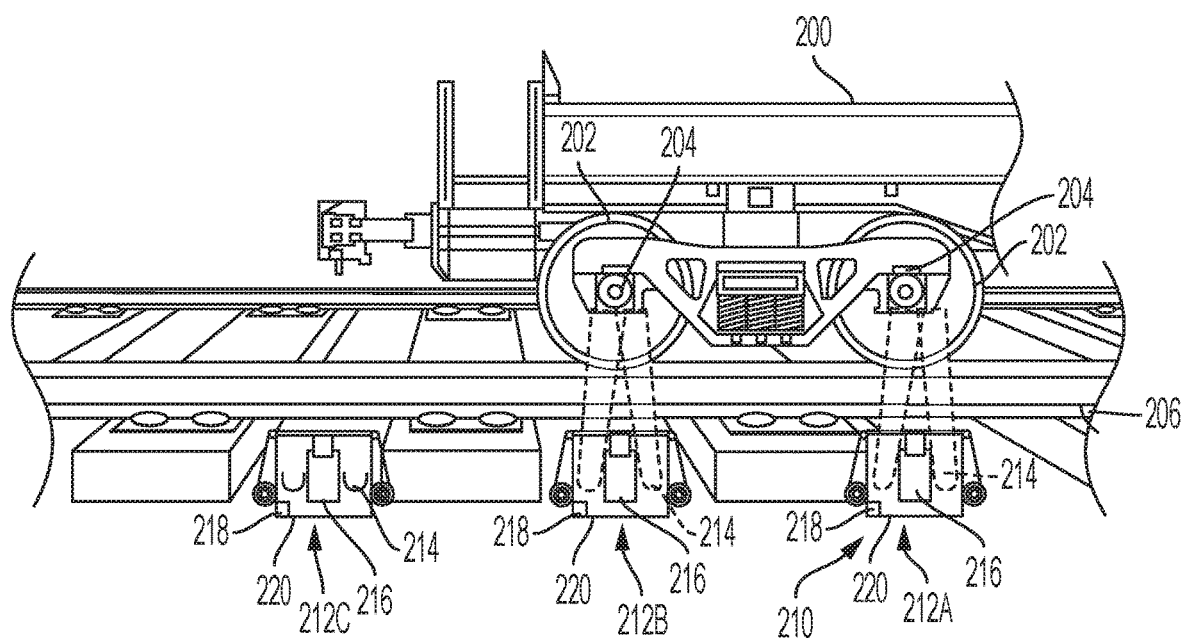
FIG. 6 is a schematic diagram of an illustrative high speed railcar axle inspection system.

As shown in FIG. 6, this section describes an illustrative system 210 for high-speed thermographic inspection of railcar axles. System 210 is another example of a high-sensitivity system for detecting surface cracks, as described above. In FIG. 6, a railcar 200 with two wheelsets 202 is shown on a track 206. System 210 is configured to inspect the surface of axles 204 of the wheelsets. The following description is for inspection of axle 204 of one of wheelsets 202, but may be understood to apply similarly to the other wheelset.

System 210 includes a plurality of flash IRT units 212*a-c*, which may also be referred to as thermography units. Each flash IRT unit of the plurality of flash IRT units 212*a-c* includes a flash source 214, an infrared camera 216, and a trigger sensor 218. System 210 further includes a processor, not shown. In some examples, one or more of flash IRT units 212*a-c* may include a speed sensor, an RFID reader, a marking tool, and/or a vision camera.

Dirt, mud, grease, and other debris may impact the quality of infrared data captured by a flash IRT unit. To address this issue, in the depicted embodiment, each flash source and an infrared camera of a flash IRT unit is provided within a protective chamber 220.

Flash source 214 of each flash IRT unit 212 is configured to apply a thermal pulse toward a surface of railcar axle 204 while railcar wheelset 202 is on a track 206. Flash source 214 may include a housing, a lighting element, and/or one or more reflectors. In one example, flash source 214 may include or take the form of a flash lamp. Flash source 214 may be a linear flash source that is arranged parallel to a longitudinal axis of railcar axle 204, and perpendicular to track 206. Flash source 214 may be configured to convert energy stored in a capacitor (not shown), or bank of capacitors, into the thermal pulse.

As shown in FIG. 6, flash source 214 is positioned beneath a height at which the railcar axle 204 rotates above track 206. With this arrangement, flash source 214 can illuminate part of a surface of railcar axle 204 from below railcar axle 204 while railcar axle 204 is on track 206. In some examples, flash source 214 can apply the thermal pulse to the surface of one of a plurality of sectors of railcar axle 204. Further, flash source 214 can be configured to apply the thermal pulse while railcar wheelset 202 is rolling on the track.

Infrared camera 216 of each flash IRT unit 212 is configured to capture infrared data indicative of a thermal response of the surface of railcar axle 204 to the thermal pulse. For instance, infrared camera 216 may be configured to capture one or more images before the thermal pulse is applied and one or more images after the thermal pulse is applied. The images captured by infrared camera 216 may be indicative of the thermal response during a brief window of time, such as a few microseconds or tens of microseconds. In line with the discussion above, if the surface of railcar axle 204 includes a crack, the crack may cause a portion of the surface to be cooler than surrounding areas on the surface. Infrared camera 216 may capture infrared data that reflects this temperature anomaly.

Like flash source 214, infrared camera 216 is positioned beneath a height at which the railcar axle 204 rotates above track 206. With this arrangement, flash source 214 can image part of a surface of railcar axle 204 from below railcar axle 204 while railcar axle 204 is on track 206. Further, infrared camera 216 may be configured to image the surface of railcar axle 204 while railcar wheelset 202 is rolling on the track.

Trigger sensor 218 of each flash IRT unit 212 is configured to trigger flash source 214 to apply the thermal pulse based on a position of railcar wheelset 202 on track 206. Trigger sensor 218 may be configured to trigger flash source 214 to apply the thermal pulse upon detection of railcar wheelset 202, or upon detection of railcar wheelset 202 and expiration of a delay time. In one example, trigger sensor 218 may also be configured to trigger infrared camera 216 to capture the infrared data based on a position of railcar wheelset 202 on track 206.

Each flash IRT unit of the plurality of flash IRT units 212*a-c* is configured to inspect a respective quarter (in other words, a ninety-degree sector) of a surface of railcar axle 204 sequentially as the wheelset rolls by on track 206. For instance, a first flash IRT unit 212*a* may be configured to capture infrared data indicative of a surface of a first sector of railcar axle 204, and a second flash IRT unit 212*b* may be configured to capture infrared data indicative of a surface of a second sector of railcar axle 204 after first flash IRT unit 212*a* captures the infrared data indicative of the surface of the first sector of railcar axle 204 and railcar axle 204 rotates. Further, each flash IRT unit 212*a-c* may be configured to capture infrared data indicative of a surface of a respective sector of railcar axle 204, while the railcar wheelset is rolling on the track.

Infrared data captured by the plurality of flash IRT units 212*a-c* may be processed individually and/or in combination. For instance, the processor may be configured to process the infrared data captured by first flash IRT unit 212a to determine whether the captured infrared data is indicative of a crack on the surface of the first sector of railcar axle 204, and then process infrared data captured by second flash IRT unit 212b to determine whether the captured infrared data is indicative of a crack on the surface of the second sector of railcar axle 204, and so forth. Additionally or alternatively, the processor may create a composite image of the surfaces of two or more sectors of railcar axle 204, and then process the composite image to determine whether the composite image is indicative of a crack on the surfaces of the two or more sectors of railcar axle 204.

C. Illustrative Data Processing System

Figure 7:
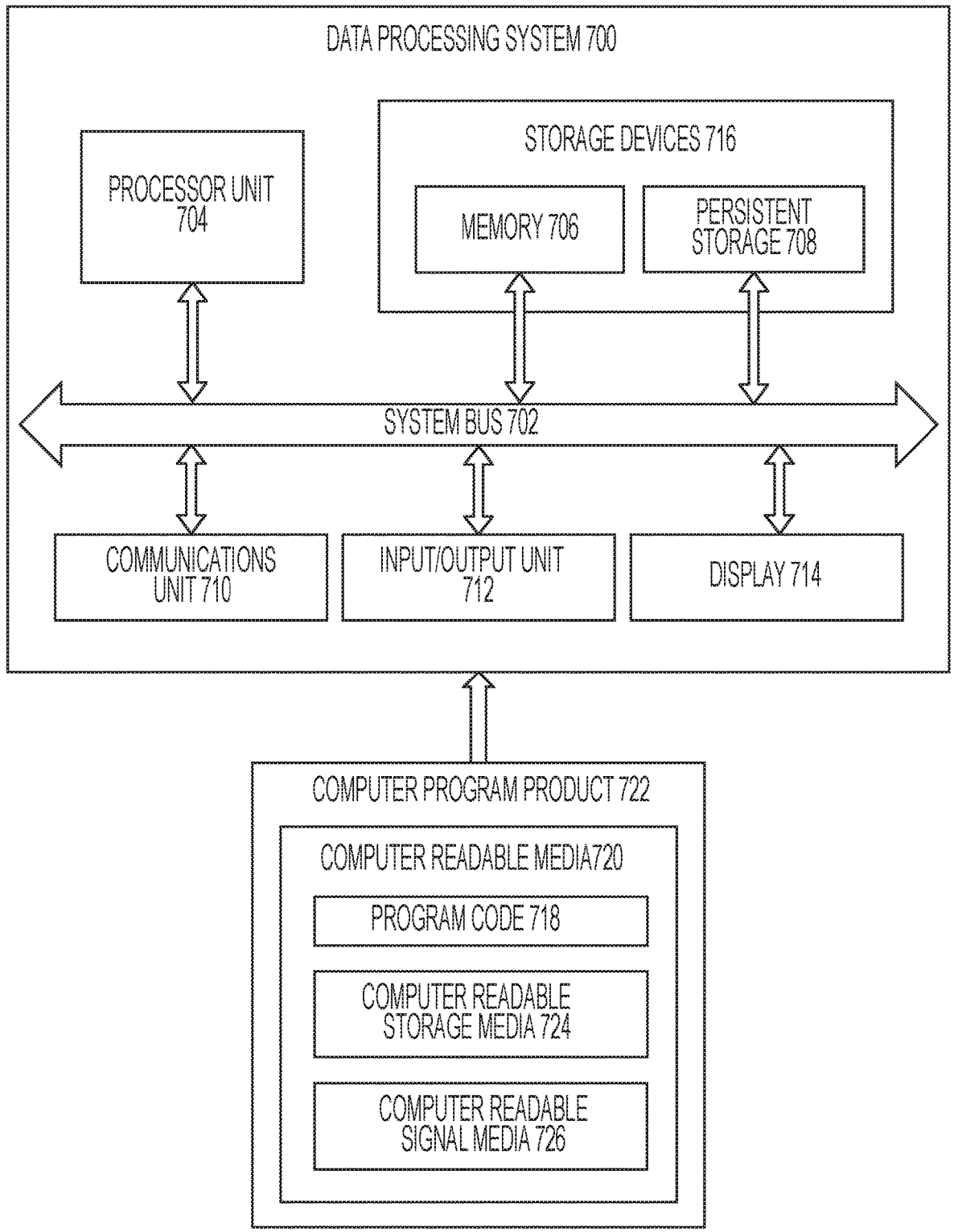
FIG. 7 is a schematic diagram of an illustrative data processing system.

As shown in FIG. 7, this example describes a data processing system 700 (also referred to as a computer, computing system, and/or computer system) in accordance with aspects of the present disclosure. In this example, data processing system 700 is an illustrative data processing system suitable for implementing aspects of the method of detecting near-surface porosity. More specifically, in some examples, devices that are examples of data processing systems (e.g., laptops, tablets, personal computers) may be used to perform one or more types of image analysis on captured thermal images. For example, such a device may be used to analyze spectra, compare intensities, and/or compensate for factors such as motion and cooling. Such a device may be used to determine whether a measured and/or recorded thermal response is indicative of one or more cracks.

In this illustrative example, data processing system 700 includes a system bus 702 (also referred to as communications framework). System bus 702 may provide communications between a processor unit 704 (also referred to as a processor or processors), a memory 706, a persistent storage 708, a communications unit 710, an input/output (I/O) unit 712, and/or a display 714.

Processor unit 704 serves to run instructions that may be loaded into memory 706. Processor unit 704 may comprise a number of processors, a multi-processor core, and/or a particular type of processor or processors (e.g., a central processing unit (CPU), graphics processing unit (GPU), etc.), depending on the particular implementation. Further, processor unit 704 may be implemented using a number of heterogeneous processor systems in which a main processor is present with secondary processors on a single chip.

Memory 706 and persistent storage 708 are examples of storage devices 716. A storage device may include any suitable hardware capable of storing information (e.g., digital information), such as data, program code in functional form, and/or other suitable information, either on a temporary basis or a permanent basis. Storage devices 716 also may be referred to as computer-readable storage devices or computer-readable media.

Persistent storage 708 may contain one or more components or devices. For example, persistent storage 708 may include one or more devices such as a magnetic disk drive (also referred to as a hard disk drive or HDD), solid state disk (SSD), an optical disk drive such as a compact disk ROM device (CD-ROM), flash memory card, memory stick, and/or the like, or any combination of these. One or more of these devices may be removable and/or portable, e.g., a removable hard drive.

Input/output (I/O) unit 712 allows for input and output of data with other devices that may be connected to data processing system 700 (i.e., input devices and output devices). For example, an input device may include one or more pointing and/or information-input devices such as a keyboard, a mouse, touch screen, microphone, digital camera, and/or the like. These and other input devices may connect to processor unit 704 through system bus 702 via interface port(s) such as a serial port and/or a universal serial bus (USB).

Output devices may use some of the same types of ports, and in some cases the same actual ports, as the input device(s). For example, a USB port may be used to provide input to data processing system 700 and to output information from data processing system 700 to an output device. Some output devices (e.g., monitors, speakers, and printers, among others) may require special adapters. Display 714 may include any suitable human-machine interface or other mechanism configured to display information to a user, e.g., a CRT, LED, or LCD monitor or screen, etc.

Communications unit 710 refers to any suitable hardware and/or software employed to provide for communications with other data processing systems or devices. While communication unit 710 is shown inside data processing system 700, it may in some examples be at least partially external to data processing system 700. Communications unit 710 may include internal and external technologies, e.g., modems, ISDN adapters, and/or wired and wireless Ethernet cards, hubs, routers, etc. Data processing system 700 may operate in a networked environment, using logical connections to one or more remote computers.

Instructions for the operating system, applications, and/or programs may be located in storage devices 716, which are in communication with processor unit 704 through system bus 702. In these illustrative examples, the instructions are in a functional form in persistent storage 708. These instructions may be loaded into memory 706 for execution by processor unit 704. Processes of one or more examples of the present disclosure may be performed by processor unit 704 using computer-implemented instructions, which may be located in a memory, such as memory 706.

These instructions are referred to as program instructions, program code, computer usable program code, or computer-readable program code executed by a processor in processor unit 704. The program code in the different examples may be embodied on different physical or computer-readable storage media, such as memory 706 or persistent storage 708. Program code 718 may be located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may comprise computer-readable storage media 724 or computer-readable signal media 726.

The different components illustrated for data processing system 700 are not meant to provide architectural limitations to the manner in which different examples may be implemented. One or more examples of the present disclosure may be implemented in a data processing system that includes fewer components or includes components in addition to and/or in place of those illustrated for computer 700. Other components shown in FIG. 7 can be varied from the examples depicted. Different examples may be implemented using any hardware device or system capable of running program code.

In some examples, processor unit 704 may take the form of a hardware unit having hardware circuits that are specifically manufactured or configured for a particular use, or to produce a particular outcome or progress. This type of hardware may perform operations without needing program code 718 to be loaded into a memory from a storage device to be configured to perform the operations. For example, processor unit 704 may be a circuit system, an application specific integrated circuit (ASIC), a programmable logic device, or some other suitable type of hardware configured (e.g., preconfigured or reconfigured) to perform a number of operations.

D. Illustrative Method

Figure 8:
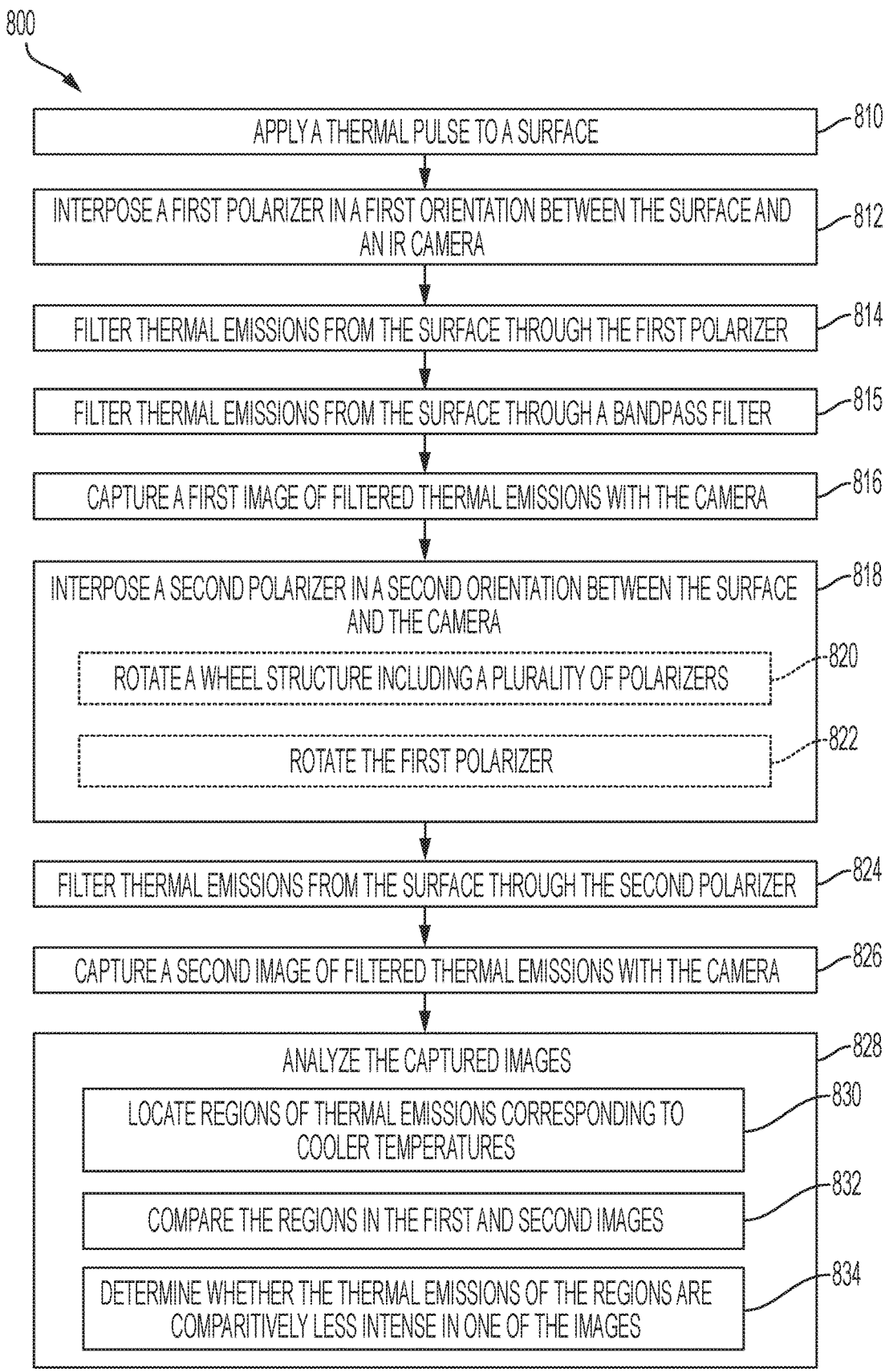
FIG. 8 is a flow chart depicting steps of an illustrative method for detecting cracks in a surface, according to the present teachings.

This section describes steps of an illustrative method for detecting cracks in a surface; see FIG. 8. Aspects of thermographic inspection systems, imaging systems, and/or polarization apparatus described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method 800, and may not recite the complete process or all steps of the method. Although various steps of method 800 are described below and depicted in FIG. 8, the steps need not necessarily all be performed, and in some cases may be performed simultaneously or in a different order than the order shown.

At step 810, the method includes applying a thermal pulse to a surface. The step may also be described as heating and/or flash heating the surface. The thermal pulse may comprise a short burst of light having sufficient energy to raise the temperature of the surface by a selected number of degrees. The thermal pulse may be generated by a flash source such as a flash lamp, and may include visible and/or near-infrared light. That is, a majority of the radiation of the thermal pulse may be between approximately 0.2 and 1 micrometers (μm) in wavelength, and the thermal pulse may have a duration of approximately 5 milliseconds (ms) or less.

The surface may include any material or materials of interest, including metals, plastics, composites, and/or natural materials. The surface may be planar, curved, and/or irregular. Method 800 may be particularly useful for reflective materials such as polished aluminum, glossy paint, and tooled carbon fiber epoxy composites. Heating of the surface in response to the thermal pulse may depend on conductivity and other properties of the material. Accordingly, wavelength and duration of the thermal pulse may be selected to produce a desired temperature increase, based on such properties of the surface.

Step 812 of method 800 includes interposing a polarizer in a first orientation between the surface and an infrared (IR) camera. In some examples, the polarizer may be positioned between the camera and the surface prior to the initiation of method 800. In some examples, polarizers of one or more orientations may be continuously rotated past the camera throughout method 800 and steps 814 and 816 may be timed according to when a polarizer in the first orientation is interposed between the surface and the camera. Methods of interposing a polarizer between the surface and the camera are discussed further with reference to step 818 below.

The first polarizer may be a wire grid polarizer, or in other words a linear polarizer including a plurality of parallel fine metal wires arranged in a plane. The polarizer may be interposed such that the plane of the polarizer is approximately parallel to and/or tangent to the surface.

Step 814 includes filtering thermal emissions from the surface through the first polarizer. The surface may radiate in response to the thermal pulse applied in step 810. The first polarizer may be positioned such that at least a portion of the emitted infrared radiation is transmitted through the polarizer. According to the orientation of the first polarizer, some radiation from linear irregularities of the surface such as cracks may be reduced in intensity. In other words, for cracks having a linear extent out of alignment with the orientation of the first polarizer some of the thermal emissions may be blocked by the first polarizer.

Optional step 815 includes filtering thermal emissions from the surface through a bandpass filter. The filter may be selected such that a passband of the filter includes wavelengths corresponding to expected thermal emissions of surface irregularities, but does not include wavelengths corresponding to expected thermal emissions of surrounding surface. The selected passband may depend on the material of the surface, the temperature change of the surface in response to the thermal pulse, and/or effects on surface cooling by expected irregularities.

At step 816, the method includes capturing a first image of filtered thermal emissions with the camera. The thermal emissions filtered through the first polarizer may be focused onto a light sensor of the camera to form the first image of the thermal response of the surface to the thermal pulse. The camera may be a high-speed camera such that the first image can be captured soon after cessation of the thermal pulse. For example, step 816 may be performed no more than 5 milliseconds (ms) or no more than 1 ms after step 810 is completed. Timing of steps 810 and 816 may be coordinated and/or recorded by a synchronization system such as a circuit and/or software run on a digital processing system.

Step 818 includes interposing a second polarizer in a second orientation between the surface and the camera. In some examples, the step may include removing the first polarizer from between the surface and the camera. In some examples the step may include changing the orientation of the first polarizer. The second polarizer may be interposed by any effective method, including but not limited to sub-steps 820 and/or 822.

Optional sub-step 820 of step 818 includes rotating a wheel structure on which is mounted a plurality of polarizers. The plurality of polarizers may include the first polarizer and the second polarizer. Rotating the wheel structure may move the plurality of polarizers successively in and out of an operative position between the camera and the surface. The wheel structure may be configured to rotate continuously and/or to rotate a selected polarizer to the operative position and then remain in that position.

Optional sub-step 822 of step 818 includes rotating the first polarizer. The first polarizer may be rotated about a central axis from the first orientation to the second orientation. In the second orientation, the first polarizer may be described as the second polarizer. In such an example, the first polarizer may remain between the surface and the camera throughout method 800.

At step 824, the method includes filtering thermal emissions from the surface through the second polarizer. In some examples, step 824 may be performed soon enough after step 810 that the surface continues to radiate in response to the thermal pulse applied in step 810. In some examples, step 810 may be repeated prior to step 824.

Similarly to step 814, the second polarizer may be positioned such that at least a portion of the emitted infrared radiation is transmitted through the second polarizer. According to the orientation of the second polarizer, some radiation from linear irregularities of the surface such as cracks, may be reduced in intensity. In other words, for cracks having a linear extent out of alignment with the orientation of the polarizer some of the thermal emissions may be blocked by the second polarizer.

The second orientation may be substantially different from the first orientation, and in some examples may be perpendicular to the first orientation. As a consequence, cracks in alignment with the first polarizer may be out of alignment with the second polarizer, and vice versa. Therefore, an intensity of emissions from a crack transmitted through the first polarizer may differ from the intensity of emissions from the crack transmitted through the second polarizer.

Step 826 of the method includes capturing a second image of filtered thermal emissions with the camera. The thermal emissions filtered through the second polarizer may be focused onto the light sensor of the camera to form the second image of a thermal response of the surface. The captured thermal response may be to the thermal pulse of step 810, or to a subsequent thermal pulse. To capture the thermal response to step 810, step 826 may be performed no more than 10 ms or no more than 2 ms after step 810 is completed.

Timing of steps 810, 816, 818, and/or 826 may be coordinated and/or recorded by a synchronization system such as a circuit and/or software run on a digital processing system. For example, rotation of a wheel structure in sub-step 820 and/or rotation of a polarizer in sub-step 822 may be coordinated with step 826. For another example, timing of an additional thermal pulse may be coordinated with step 826.

Step 828 of method 800 includes analyzing the images captured in steps 816 and 826. In some examples, the step may further include analyzing one or more additional images of a thermal response of the surface through a polarizer in other orientations. A digital processing system such as described in Example C above may be used to perform the analysis.

Sub-step 830 of step 828 includes locating regions of thermal emissions corresponding to cooler temperatures. Regions of cooler temperature may correspond to irregularities in or on the surface, which may cause accelerated cooling. Each of the images may be analyzed for areas on the surface that are cooler relative to surrounding areas of the surface. For instance, the sub-step may include looking for areas that are a tenth of a degree cooler, one-half of a degree cooler, or one degree cooler than surrounding areas on the surface. Another technique for identifying colder areas may include calculating thermal gradients and searching for areas having non-zero thermal gradients. In some examples, identifying colder areas may involve pre-processing the images to enhance the contrast of temperature differentials on the surface.

Sub-step 832 of step 828 includes comparing the located regions in the first and second images. In other words, for each region of an image located in sub-step 830 the corresponding regions in the other image or images may be compared. The comparison may include calibration of one or more of the images according to timing and/or movement over the course of method 800.

For example, if the surface moves relative to the camera between steps 816 and 826 then sub-step 832 may include registering the second image relative to the first image according to a recorded extent of the movement. For another example, if step 826 is performed without application of an additional thermal pulse, sub-step 832 may include adjusting relative intensity of the second image to account for reduced overall temperature of the surface due to the additional time elapsed since the application of the thermal pulse of step 810.

Step 834 of the method includes determining whether the thermal emissions of the compared regions are less intense in one of the images. As described above, for irregularities having a linear extent, some of the thermal emissions from that region may be blocked by either the first or second polarizer but not the other. Step 834 may therefore separate linear irregularities such as cracks from other non-linear irregularities such as surface contaminants, imaging artefacts, and/or material porosity. Distinguishing such irregularities may improve the sensitivity of the thermographic inspection to cracks.

Illustrative Combinations and Additional Examples

This section describes additional aspects and features of systems and methods for detection of surface cracks, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of thermographic inspection, comprising:
applying a thermal pulse to a surface,
capturing a first image of a thermal response of the surface with an infrared camera through a first polarizer having a first orientation, and
determining, by analysis of the first image, whether the thermal response is indicative of a crack on the surface.

A1. The method of A0, wherein the polarizer is a wire grid polarizer.

A2. The method of A0 or A1, further comprising:
interposing a second polarizer having a second orientation between the surface and the infrared camera, and
capturing a second image of the thermal response of the surface with the infrared camera through the second polarizer,
wherein, determining whether the thermal response is indicative of a crack on the surface includes comparing the first image and the second image.

A3. The method of A2, wherein the first orientation and the second orientation are orthogonal.

A4. The method of A2 or A3, wherein the determining step includes identifying an area of lower temperature in the first and second images.

A5. The method of A4, wherein the determining step further includes comparing the intensity of light captured from the identified area in the first image with the intensity of light captured from the identified area in the second image.

A6. The method of any of A2-A5, wherein the steps of capturing a first image, interposing a second polarizer, and capturing a second image are performed within 30 milliseconds from the application of the thermal pulse.

A7. The method of any of A2-A6, wherein the first polarizer and the second polarizer are mounted to a wheel structure and interposing the second polarizer includes rotating the wheel structure.

A8. The method of any of A0-A7, wherein comparing the first image and the second image includes registering the second image relative to the first image based on a recorded movement of the surface between the steps of capturing the first image and capturing the second image.

A9. The method of any of A0-A8, further comprising:
rotating the first polarizer from the first orientation to a second orientation, and
capturing a second image of the thermal response of the surface with the infrared camera through the first polarizer,
wherein, determining whether the thermal response is indicative of a crack on the surface includes comparing the first image and the second image.

A10. The method of any of A0-A9, further comprising filtering the thermal response of the surface through a bandpass filter prior to capturing the first image.

A11. The method of any of A0-A10, wherein the first orientation is parallel to an expected crack direction.

A12. The method of any of A0-A11, wherein the surface is of a train axle.

A13. The method of any of A0-A11, wherein the surface is of an aircraft fuselage.

A14. The method of any of A0-A11, wherein the surface is of an aircraft structural member.

B0. A method of detecting cracks in a surface, comprising:
heating the surface,
capturing a first image of thermal emissions from the surface through a wire grid polarizer in a first orientation,
capturing a second image of thermal emissions from the surface through a wire grid polarizer in a second orientation,
comparing the first and second images,
identifying regions of the surface with thermal emissions corresponding to a cooler temperature, wherein the thermal emissions corresponding to a cooler temperature have a relatively greater intensity in the first image or the second image.

B1. The method of B0, wherein the first orientation and the second orientation are orthogonal.

B2. The method of B0 or B1, wherein the first image and the second image are captured within 30 milliseconds of heating the surface.

B3. The method of B0 or B2, further comprising heating the surface again after capturing the first image and before capturing the second image.

B4. The method of claim B0, wherein heating the surface includes generating a thermal pulse with a light source.

B5. The method of B4, wherein the thermal pulse has a wavelength between approximately 0.2 and 1 micron.

B6. The method of B5, wherein the thermal emissions corresponding to a cooler temperature have a wavelength between approximately 3 and 50 micrometers.

B7. The method of B6, wherein the thermal emissions corresponding to a cooler temperature have a wavelength between approximately 3 and 8 micrometers.

B8. The method of B7, wherein the thermal emissions corresponding to a cooler temperature have a wavelength between approximately 5 and 6 micrometers.

B9. The method of B6, wherein the thermal emissions corresponding to a cooler temperature have a wavelength between approximately 8 and 15 micrometers.

C0. A system for detecting cracks in a surface, comprising:
a light source configured to generate a thermal pulse incident on the surface,
an infrared camera configured to capture an image of a response of the surface to the thermal pulse,
a first wire grid polarizer interposed between the surface and the infrared camera, having a first orientation, and
a data processing system in communication with the infrared camera and configured to analyze the captured image.

C1. The system of C0, further comprising a second wire gird polarizer having a second orientation, wherein the first polarizer and the second polarizer are mounted on a wheel structure configured to alternately interpose the first polarizer and the second polarizer between the surface and the infrared camera by rotating.

C2. The system of C1, wherein the first and second orientations are orthogonal.

C3. The system of any of C0-C2, further comprising a bandpass filter interposed between the surface and the infrared camera.

C4. The system of C3, wherein the bandpass filter has a passband within approximately 5 and 6 micrometers.

C5. The system of C3, wherein the bandpass filter has a passband within approximately 8 and 15 micrometers.

C6. The system of C3, wherein the bandpass filter has a passband within approximately 3 and 50 micrometers.

C7. The system of any of C0-C4, wherein the light source, infrared camera, and first wire grid polarizer comprise a first thermography unit and the system further includes a second thermography unit having a second light source, a second wire grid polarizer, and a second infrared camera in communication with the data processing system.

Advantages, Features, and Benefits

The different examples of the thermographic inspection systems and methods described herein provide several advantages over known solutions for detecting surface cracks. For example, illustrative examples described herein allow rapid inspection of a surface without contact or application of a chemical substance.

Additionally, and among other benefits, illustrative examples described herein allow improved detection of linear features.

Additionally, and among other benefits, illustrative examples described herein allow higher signal-to-noise imaging.

Additionally, and among other benefits, illustrative examples described herein allow effective scanning of highly reflective materials.

No known system or device can perform these functions, particularly on a moving surface. Thus, the illustrative examples described herein are particularly useful for inspection of vehicles such as railcars and/or for integration into high capacity manufacturing. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of thermographic inspection, comprising:
applying a thermal pulse to a surface,
capturing a first image of a thermal response of the surface with an infrared camera through a first polarizer having a first orientation, and
determining, by analysis of the first image, whether the thermal response is indicative of a crack on the surface, wherein analysis of the first image includes identifying an area of lower temperature and comparing the intensity of light captured from the identified area to another image of a thermal response of the surface.

2. The method of claim 1, wherein the polarizer is a wire grid polarizer.

3. The method of claim 1, further comprising:
interposing a second polarizer having a second orientation between the surface and the infrared camera, and
capturing a second image of the thermal response of the surface with the infrared camera through the second polarizer,
wherein, comparing the intensity of light captured from the identified area to another image includes comparing the first image and the second image.

4. The method of claim 3, wherein the first orientation and the second orientation are orthogonal.

5. The method of claim 3, wherein identifying an area of lower temperature includes identifying an area of lower temperature in the first and second images.

6. The method of claim 5, wherein comparing the intensity of light includes comparing the intensity of light captured from the identified area in the first image with the intensity of light captured from the identified area in the second image.

7. The method of claim 3, wherein the steps of capturing a first image, interposing a second polarizer, and capturing a second image are performed within 30 milliseconds from the application of the thermal pulse.

8. The method of claim 3, wherein the first polarizer and the second polarizer are mounted to a wheel structure and interposing the second polarizer includes rotating the wheel structure.

9. The method of claim 1, further comprising:
rotating the first polarizer from the first orientation to a second orientation, and
capturing a second image of the thermal response of the surface with the infrared camera through the first polarizer,
wherein, comparing the intensity of light captured from the identified area to another image includes comparing the first image and the second image.

10. The method of claim 1, further comprising filtering the thermal response of the surface through a bandpass filter prior to capturing the first image.

11. The method of claim 1, wherein the first orientation is parallel to an expected crack direction.

12. A method of detecting cracks in a surface, comprising:
heating the surface,
capturing a first image of thermal emissions from the surface through a polarizer in a first orientation,
capturing a second image of thermal emissions from the surface through a polarizer in a second orientation,
identifying an area of lower temperature in the first and second images,
comparing the intensity of light captured from the identified area in the first and second images,
determining, for the identified area, whether the area is indicative of a crack on the surface.

13. The method of claim 12, wherein the first orientation and the second orientation are orthogonal.

14. The method of claim 12, further comprising heating the surface again after capturing the first image and before capturing the second image.

15. The method of claim 12, wherein heating the surface includes generating a thermal pulse with a light source.

16. The method of claim 12, wherein the method further includes rotating the polarizer from the first orientation to the second orientation.

17. A system for detecting cracks in a surface, comprising:
a light source configured to generate a thermal pulse incident on the surface,
an infrared camera configured to capture an image of a response of the surface to the thermal pulse,
a first wire grid polarizer interposed between the surface and the infrared camera, having a first orientation, and
a data processing system in communication with the infrared camera, including a processor and a plurality of stored instructions executable by the processor to:
identify an area of lower temperature in the captured image of the response of the surface, and
compare the intensity of light captured from the identified area to another captured image of a response of the surface to a thermal pulse.

18. The system of claim 17, further comprising a second wire grid polarizer having a second orientation, wherein the first polarizer and the second polarizer are mounted on a wheel structure configured to alternately interpose the first polarizer and the second polarizer between the surface and the infrared camera by rotating.

19. The system of claim 17, further comprising a bandpass filter interposed between the surface and the infrared camera.

20. The system of claim 17, wherein the light source, infrared camera, and first wire grid polarizer comprise a first thermography unit and the system further includes a second thermography unit having a second light source, a second wire grid polarizer, and a second infrared camera in communication with the data processing system.

* * * * *